June 8, 1965 S. DUINKER ETAL 3,187,411

METHOD OF MANUFACTURING POLE-PIECE UNITS FOR MAGNETIC HEADS

Filed July 28, 1961

INVENTORS
SIMON DUINKER
JULES BOS
BY Frank R. Trifari
AGENT 3,187,411
Patented June 8, 1965

3,187,411

METHOD OF MANUFACTURING POLE-PIECE UNITS FOR MAGNETIC HEADS

Simon Duinker and Jules Bos, both of Emmasingel, Eindhoven, Netherlands, assignors to North American Philips Company, Inc., New York, N.Y., a corporation of Delaware Filed July 28, 1961, Ser. No. 127,715
Claims priority, application Netherlands, Sept. 27, 1960, 256,305/60
4 Claims. (Cl. 29—155.5)

This invention relates to methods for the manufacture of pole-piece units for magnetic heads used for magnetically recording, reproducing and/or erasing information in a track of a magnetic record carrier. Specifically, it relates to a magnetic head comprising a pole-piece unit formed by at least two parts separated by at least one useful gap filled with a non-magnetic material and a rear yoke adjoining the pole-piece unit so that each useful gap forms part of an annular ferromagnetic circuit; preferably, the pole-piece unit and the rear yoke are composed of a sintered oxidic ferromagnetic material.

Such pole-piece units are presently manufactured by a method which will be described with reference to FIG. 1 of the accompanying drawing. Manufacture begins with two parts 1 and 2 each consisting of sintered oxidic ferromagnetic material and each provided with two accurately processed surfaces 3, 4 and 5, 6 respectively. These surfaces of the parts 1 and 2 are placed against each other with the interposition of foils or sheets 7 of non-magnetic material having the property of adhering to the ferromagnetic material by the use of a thermal treatment and also having a mechanical rigidity in the solid state about equal to that of the ferromagnetic material. Examples of such non-magnetic materials are glass and solder. These materials are liquefied by heating and the circuit parts are pressed toward each other while the non-magnetic material is in the liquid state at a pressure such that, after the glass or the solder has hardened, the formed gap has the correct length for the desired operating conditions. Consequently, the non-magnetic material serves both to protect the useful gap and to mechanically join the two circuit parts.

Subsequently, a suitable non-magnetic stiffening rod 8, for example of Alundum or kersima, is arranged in a central space 9. The rod 8 is glued in position, for example with the aid of araldite, whereupon the assembly is sawed through along a plane 10, so that two individual pole-piece units are obtained.

The suitable shaping of the parts 1 and 2, the process of maintaining them relatively fixed at a high temperature, and also the manufacture and securement of stiffening rods 8 all involve expensive and difficult procedures. In addition, there is a risk of the assembly breaking through along the gap forming surfaces, for example due to swelling of the glue layer.

An object of the invention is to provide a method which is simpler and more economical and produces a head which is less liable to the type of breakage set forth above.

The method according to the invention starts with two blocks of sintered oxide ferromagnetic material, each provided with an accurately processed unprofiled surface; the surfaces are placed against each other with the inter-position of a non-magnetic material which adheres to the ferromagnetic material by the use of a thermal treatment, the two blocks being pressed against each other at a pressure such that, below a certain temperature, the gap between the two blocks acquires a length corresponding to the length of the useful gap and the material after the thermal treatment having a mechanical strength of the same order as that of the ferromagnetic material. Subsequently, one or more cylindrical apertures are provided at a portion of the area of the gap filled with the non-magnetic material, the axes of the cylindrical apertures being substantially parallel to the gap. Then the apertures are filled with a second non-magnetic material which has the property of adhering to the ferromagnetic material by the use of a thermal treatment; however, the temperatures occurring during the last-mentioned thermal treatment are lower than the first-mentioned certain temperature. After hardening, the resulting assembly is divided along planes each passing through one of the apertures, substantially parallel to the axes of the apertures, and intersecting the gap.

The invention also relates to pole-piece units obtained by this method.

In order that the invention may be readily carried into effect, it will now be described in detail, by way of example, with reference to FIGS. 2 and 3 of the accompanying diagrammatic drawing, wherein.

Figure 1:
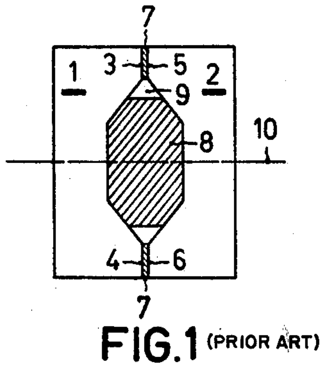
FIG.1 (PRIOR ART)
Figure 2:
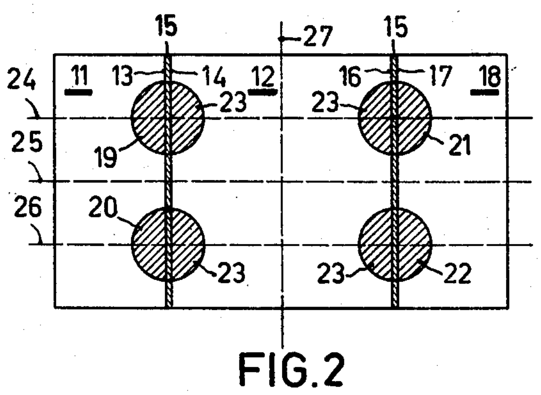
FIGURE 2 illustrates a method for manufacturing pole-piece units according to the invention.

In FIG. 2 there are shown two blocks 11 and 12 of sintered oxidic ferromagnetic material, each provided with an accurately processed surface 13 and 14, respectively. These surfaces of the blocks 11 and 12 are urged against each other with the interposition of a non-magnetic material 15. This non-magnetic material may be, for example, glass or solder which is placed between the surfaces in the form of foils or sheets. The assembly is heated to a temperature at which the glass softens or the solder melts. The blocks 11 and 12 are now pressed against each other at a pressure such that after cooling, the length of the gap between the two blocks is equal to the length of the useful gap of the magnetic head to be manufactured.

Another example of suitable non-magnetic material is water-glass, which may be provided as a thin liquid layer on each of the surfaces 13 and 14. After heating to a suitable temperature (800° C. with a water-glass containing from 7% to 9% by weight of $Na_2O$ and from 24% to 27% by weight of $SiO_2$) the water-glass on the surfaces hardens upon cooling to form layers which have adhered to the ferromagnetic material of the blocks 11 and 12 respectively. The blocks are placed with the surfaces covered with said layers against each other and subsequently heated under pressure to a temperature such (in the example up to 800° C. to 900° C.) that the two water glass layers combine into a single layer. Thus, an adhesion may also be obtained in this manner which is of the same order as that of the ferromagnetic material itself.

In FIG. 2, the block 12 is also provided with an accurately processed surface 16. Between the surface 16 and an accurately processed surface 17 of a third block 18, which likewise consists of sintered oxidic ferro-magnetic material, there is also provided non-magnetic material 15 which mechanically joins together the two blocks 12 and 18.

The resulting assembly is provided, at both areas including the non-magnetic material 15, with apertures 19, 20, 21 and 22 which have axes located in, or at least substantially parallel to, the surfaces of the gaps filled with material 15. These apertures are subsequently filled with a second non-magnetic material 23 which, similar to material 15, has the ability to adhere to the ferromagnetic material by the use of a thermal treatment. It is necessary, however, that the temperatures occurring during this thermal treatment be lower than the temperature at which the gap-filling material 15 liquefies. The material 23 may be placed in the apertures in the form of cylinders. If the material 23 is glass, it may, for example, also be provided in the apertures in the pulverulent state. The material 23 is suitably liquefied by heating and adheres to the ferromagnetic material upon cooling. In order that the apertures 19, 20, 21 and 22 may be properly filled by the material 23, the passage from the liquid state to the solid state may take place under the application of pressure.

After cooling, the assembly is divided along planes 24, 25, 26 and 27; thus, eight pole-piece units are obtained in the example chosen.

Each pole-piece unit is then provided with a guide surface by means of accurate processing, for example polishing.

Alternatively, however, the guide surfaces may be provided for example immediately after the parts 11, 12 and 13 have adhered together, or after the apertures 19 to 22 have been formed and filled with material 23.

In the foregoing, the assembly of FIG. 2 is also divided along a plane 27. This step may be omitted if it is desired to obtain a pole-piece unit having two useful gaps located one after the other. Magnetic heads having two gaps located one after the other may be used for several applications. It is possible, for example, to use one gap for recording and the other for reproduction, the recording and reproducing head thus being combined in a single magnetic head as is advantageous, for example, in recording pulses for computer purposes. The signal recorded by the recording head may then be checked immediately with the aid of the reproducing head.

It is to be noted that the non-magnetic materials 15 and 23 are preferably such materials as have coefficients of expansion substantially equal to the temperature coefficient of the sintered oxidic ferromagnetic material in the whole temperature range traversed in the method during the thermal treatments.

Figure 3:
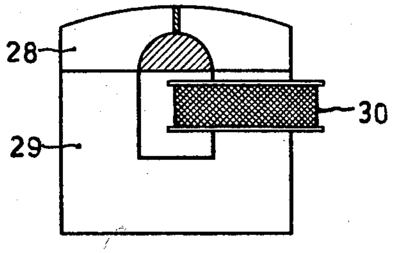
FIGURE 3 shows a pole-piece unit thus obtained incorporated in a magnetic head.

FIG. 3 shows a pole-piece unit obtained by the above-described method as a component part of a magnetic head. This pole-piece unit is indicated by 28. There is also shown in FIG. 3 a closure yoke 29 for the head on which a coil 30 is arranged. The closure yoke 29 preferably likewise consists of sintered oxidic ferromagnetic material.

Obviously, many modifications of the invention are possible in the light of the above teachings. It is therefore to be understood that, within the scope of the appended claims, the invention may be practiced otherwise than as specifically described.

What is claimed is:

1. A method of manufacturing pole-piece units for magnetic heads comprising: placing an accurately processed unprofiled surface of one block of sintered oxidic ferromagnetic material against an accurately processed surface of a second block of the same material with the interposition of a first gap-forming non-magnetic material which melts and adheres to said surfaces when heated to a first temperature, pressing said surfaces against each other substantially at said first temperature until a desired gap length is reached, forming at least one aperture in the resulting assembly, each aperture extending through said assembly and the formed gap and having an axis substantially parallel to the gap, filling each aperture with a second non-magnetic material which melts and adheres to said ferromagnetic material at a second temperature lower than said first temperature, heating the assembly to said second temperature, and cutting said assembly in planes each passing lengthwise through one aperture.

2. A method of manufacturing pole-piece units for magnetic heads comprising: placing an accurately processed unprofiled surface of one block of sintered oxidic ferromagnetic material against an accurately processed surface of a second block of the same material with the interposition of a first gap-forming non-magnetic material which melts and adheres to said surfaces when heated to a first temperature, pressing said surfaces against each other substantially at said first temperature until a desired gap length is reached, forming at least one cylindrical aperture in the resulting assembly, each aperture extending through said assembly and the formed gap and having an axis substantially parallel to the gap, filling each aperture with a second non-magnetic material which melts and adheres to said ferromagnetic material at a second temperature lower than said first temperature, heating the assembly to said second temperature while applying pressure to said second non-magnetic material, and cutting said assembly in planes each passing lengthwise through one aperture substantially perpendicular to the gap.

3. A method of manufacturing pole-piece units for multiple magnetic heads comprising: placing an accurately processed unprofiled surface of one block of sintered oxidic ferromagnetic material against a first accurately processed surface of a second block of the same material with the interposition of a first gap-forming non-magnetic material which melts and adheres to said surfaces when heated to a first temperature, placing an accurately processed unprofiled surface of a third block of the same material against a second accurately processed surface of said second block with the interposition of a gap-forming material having the same properties as said first gap-forming material, said first and second surfaces of said second block being located opposite and parallel to each other, pressing the facing surfaces against each other substantially at said first temperature until desired gap lengths are reached, forming at least two cylindrical apertures in the resulting assembly, each aperture extending through said assembly and one of the formed gaps and having an axis substantially parallel to the gap, filling each aperture with a second non-magnetic material which melts and adheres to said ferromagnetic material at a second temperature lower than said first temperature, heating the assembly to said second temperature, and cutting said assembly in planes each passing lengthwise through one aperture extending through one of the formed gaps and a second aperture extending through the other formed gap.

4. A method as set forth in claim 3, wherein the assembly is also cut in another plane substantially at right angles to said planes and extending between said one and second apertures.

References Cited by the Examiner

UNITED STATES PATENTS

| | | | |
|---|---|---|---|
| 2,919,312 | 12/59 | Rosenberger et al. | |
| 3,049,790 | 8/62 | Camras. | |
| 3,094,772 | 6/63 | Duinker | 29—155.56 X |
| 3,126,615 | 3/64 | Duinker. | |
| 3,145,452 | 8/64 | Camras. | |

FOREIGN PATENTS

| | | |
|---|---|---|
| 796,306 | 6/58 | Great Britain. |

JOHN F. CAMPBELL, *Primary Examiner.*

BERNARD KONICK, *Examiner.*